(12) United States Patent
Chen et al.

(10) Patent No.: US 9,015,074 B2
(45) Date of Patent: Apr. 21, 2015

(54) DEVICE AND METHOD FOR FACILITATING FINANCIAL TRANSACTIONS

(75) Inventors: Qun Chen, Mississauga (CA); Kenneth James Emerson, Toronto (CA); Edward Vincent O'Meara, Toronto (CA)

(73) Assignee: Mazooma Technical Services, Inc., Toronto, Ontario (CA)

(*) Notice: Subject to any disclaimer, the term of this patent is extended or adjusted under 35 U.S.C. 154(b) by 261 days.

(21) Appl. No.: 13/608,003

(22) Filed: Sep. 10, 2012

(65) Prior Publication Data

US 2012/0330841 A1 Dec. 27, 2012

Related U.S. Application Data (60) Continuation-in-part of application No. 12/781,686, filed on May 17, 2010, now Pat. No. 8,271,385, which is a division of application No. 12/024,581, filed on Feb. 1, 2008, now Pat. No. 7,720,764.

(51) Int. Cl.
G06Q 40/00 (2012.01)
G06Q 20/12 (2012.01)
G06Q 20/10 (2012.01)
G06Q 20/20 (2012.01)
(Continued)

(52) U.S. Cl.
CPC ............ *G06Q 20/12* (2013.01); *G06Q 20/102* (2013.01); *G06Q 20/204* (2013.01); *G06Q 20/382* (2013.01); *G06Q 20/383* (2013.01); *G06Q 20/40* (2013.01); *G06Q 20/401* (2013.01); *G06Q 30/0601* (2013.01); *G06Q 40/00* (2013.01); *G06Q 40/04* (2013.01); *G06Q 40/08* (2013.01); *G06Q 40/10* (2013.01); *G06Q 20/108* (2013.01)

(58) Field of Classification Search
USPC ............ 705/4, 14, 17, 30, 35, 37, 39, 40, 64, 705/74; 713/187; 709/224
See application file for complete search history.

(56) References Cited

U.S. PATENT DOCUMENTS 5,484,988 A 1/1996 Hills et al.
5,974,146 A 10/1999 Randle et al.
(Continued)

FOREIGN PATENT DOCUMENTS

WO 2006113834 10/2006

*Primary Examiner* — James Trammell
*Assistant Examiner* — Sanjeev Malhotra
(74) *Attorney, Agent, or Firm* — The Concept Law Group, P.A.; Scott D. Smiley; Yongae Jun (57) ABSTRACT

A device, system, and method for conducting a secure transaction over a network includes receiving from a user, being issued a stored-value financial instrument, a dollar amount to be associated to the stored-value financial instrument, communicating the dollar amount to a debit agent residing on a network processing and communication device, receiving at the debit agent a selection of a non-integrated financial institution selected from a list that includes at least one non-integrated financial institution, receiving at the debit agent a financial-institution user-identifier from the user, communicating the financial-institution user-identifier from the debit agent to the selected non-integrated financial institution, participating in a user-free electronic dialogue between the debit agent and the selected non-integrated financial institution, the dialogue including a request to transfer funds from the selected non-integrated financial institution, and transferring, with the debit agent, the funds from the selected non-integrated financial institution to the stored-value financial instrument.

17 Claims, 6 Drawing Sheets

(51) Int. Cl.
  *G06Q 20/38* (2012.01)
  *G06Q 20/40* (2012.01)
  *G06Q 30/06* (2012.01)
  *G06Q 40/04* (2012.01)
  *G06Q 40/08* (2012.01)

(56) References Cited

U.S. PATENT DOCUMENTS

| | | | |
|---|---|---|---|
| 6,173,272 B1 | 1/2001 | Thomas et al. | |
| 7,103,579 B1 | 9/2006 | Philips et al. | |
| 7,146,338 B2 | 12/2006 | Kight et al. | |
| 7,165,052 B2 | 1/2007 | Diveley | |
| 7,177,836 B1 | 2/2007 | German et al. | |
| 7,184,989 B2 | 2/2007 | Hansen et al. | |
| 7,213,003 B1 | 5/2007 | Kight et al. | |
| 7,249,093 B1 | 7/2007 | King | |
| 7,290,704 B1 | 11/2007 | Ball et al. | |
| 7,318,049 B2 | 1/2008 | Iannacci | |
| 2002/0032653 A1* | 3/2002 | Schutzer | 705/40 |
| 2002/0052853 A1 | 5/2002 | Munoz | |
| 2002/0077978 A1 | 6/2002 | O'Leary et al. | |
| 2002/0087465 A1* | 7/2002 | Ganesan et al. | 705/39 |
| 2002/0095377 A1 | 7/2002 | Likourezos et al. | |
| 2002/0103756 A1 | 8/2002 | Andrews et al. | |
| 2002/0107767 A1* | 8/2002 | McClair et al. | 705/35 |
| 2003/0018554 A1* | 1/2003 | Lyftogt et al. | 705/35 |
| 2003/0065563 A1* | 4/2003 | Elliott et al. | 705/14 |
| 2003/0070080 A1* | 4/2003 | Rosen | 713/187 |
| 2003/0105725 A1* | 6/2003 | Hoffman | 705/75 |
| 2003/0126075 A1 | 7/2003 | Mascavage, III et al. | |
| 2003/0140004 A1 | 7/2003 | O'Leary et al. | |
| 2003/0187791 A1 | 10/2003 | Weichert et al. | |
| 2003/0212632 A1 | 11/2003 | Keogh et al. | |
| 2003/0220884 A1* | 11/2003 | Choi et al. | 705/64 |
| 2004/0083184 A1* | 4/2004 | Tsuei et al. | 705/74 |
| 2004/0093277 A1 | 5/2004 | Faerch et al. | |
| 2004/0098350 A1* | 5/2004 | Labrou et al. | 705/64 |
| 2004/0148258 A1 | 7/2004 | Tillett | |
| 2004/0153398 A1* | 8/2004 | Baumgartner et al. | 705/39 |
| 2004/0158522 A1 | 8/2004 | Brown et al. | |
| 2004/0210521 A1 | 10/2004 | Crea et al. | |
| 2006/0036544 A1* | 2/2006 | Dharam | 705/40 |
| 2006/0095350 A1* | 5/2006 | Hall et al. | 705/30 |
| 2006/0143124 A1 | 6/2006 | Ehrke | |
| 2006/0212391 A1* | 9/2006 | Norman et al. | 705/40 |
| 2006/0224508 A1 | 10/2006 | Fletz | |
| 2006/0242058 A1 | 10/2006 | Torto | |
| 2007/0100770 A1 | 5/2007 | Grinberg et al. | |
| 2007/0136180 A1* | 6/2007 | Salomon et al. | 705/37 |
| 2007/0136191 A1 | 6/2007 | Itwaru | |
| 2007/0162387 A1 | 7/2007 | Cataline et al. | |
| 2007/0174448 A1* | 7/2007 | Ahuja et al. | 709/224 |
| 2007/0255644 A1* | 11/2007 | Elder | 705/37 |
| 2007/0299699 A1* | 12/2007 | Policelli et al. | 705/4 |
| 2008/0046362 A1* | 2/2008 | Easterly | 705/40 |
| 2008/0249911 A1 | 10/2008 | Chan et al. | 705/35 |
| 2008/0288358 A1* | 11/2008 | Hall et al. | 705/17 |
| 2008/0313047 A1* | 12/2008 | Casares et al. | 705/17 |

* cited by examiner

DEVICE AND METHOD FOR FACILITATING FINANCIAL TRANSACTIONS

FIELD OF THE INVENTION

The present invention relates generally to transferring funds to a financial instrument used to facilitate on-line or off-line economic transactions, and, in particular, to a method, device, and system that facilitates electronic fund transfers from a financial institution to an intermediary financial instrument used to make on-line or off-line economic transactions.

BACKGROUND OF THE INVENTION

Purchases of goods and services over the internet have transformed from what was once a novel way of conducting a business transaction to a now well-known mainstream method of acquiring those goods and services. These "on-line" transactions include making a selection from an offering at a merchant's website, entering payment information, and concluding the transaction by authorizing the merchant to receive funds. Presently, there are several methods by which a consumer can electronically pay for the purchases made on the Internet, which are, namely, credit cards, debit cards, direct debit, and electronic funds transfers. Each of these methods, however, has its own advantages and disadvantages.

When making an on-line purchase with a credit card, or a debit cards that are "signature-based" as opposed to "pin-based," the consumer provides the merchant with card information sufficient to process the transaction. The information can include the card number, a security code referred to as CVV2, the card holder's address, the card's expiration date, and more. The amount of the purchase is then charged to the associated credit card or debit card account. Many of these cards are susceptible to fraud, especially when used over the Internet because the physical card is never presented to the merchant. This allows anyone with the misappropriated credit-card information to initiate a transaction, potentially depleting the funds in the user's account. In addition, often times a verification to check whether the credit card owner has in fact authorized the purchase is typically not performed, especially during on-line purchases. This lack of security makes many purchasers reluctant to use a credit card over the Internet.

Debit cards, whether they are "signature-based" or "pin-based," can be used to make purchases on-line. Debit cards are really "signature" based check cards that are associated with a bank account. They are analogous to a check with insufficient funds (NSF) and overdraft protection. A consumer can initiate the on-line purchase by supplying his or her account number and generally one other piece of information, such as a three or four digit number stamped on the physical card, and the amount of the purchase is debited directly from the consumer's account. One major disadvantage of debit cards, from a consumer's point of view, is the inability to immediately reverse or repudiate the transaction. Once the funds are withdrawn from the consumer's account, he or she will be forced to do without those funds during any dispute procedures. Interception of the account number and other piece of information, such as the three or four digit number stamped on the physical card allows a third party direct access to a consumer's funds. This possibility makes many consumers reluctant to use debit cards over the internet. Therefore security is a major drawback. Also, fees for overdrafts are high. Similar to credit cards, the information associated with the debit cards are also susceptible to misappropriation.

Fund transfer methods of payment for on-line purchases are also known. Fund transfer methods include payment employing an intermediate account whereby a consumer transfers funds from his personal financial-institution account into the intermediate account and then uses the funds in the intermediate account in making an on-line purchase. These systems include electronic wallets (or ewallets), internet pay anyone (IPA) accounts and virtual or physical pre-paid credit cards. When paying for an on-line purchase from an intermediate account the consumer may be required to provide the merchant with information identifying his intermediate account such as a user identifier (User ID) and a password. Many of these systems, however, are limited to only certain merchants who accept payment through these intermediate accounts, which limits these methods' versatility. Furthermore, many of these fund transfer accounts require constant monitoring and entering the financial-institution information in order to transfer funds from the financial institution to the intermediary account. This is problematic for many users as they are required to have the information available in order to make the transfer. Moreover, many of these methods only allow funds to be added to the intermediary account when the user is online and, in some instances, only when the user is logged on to the user's financial-institution website.

If the consumer does not have sufficient funds in the intermediate account, the on-line transaction will be denied. These methods also do not provide a means to automatically fund the intermediary account. As such, funding these intermediate accounts require the consumer to plan ahead; it may take one to five business days before a consumer who has transferred funds into his intermediate account to access those funds. During this time, the funds are debited from the consumer's personal financial-institution account and the consumer disadvantageously does not have access to these funds. On the other side, the intermediate account provider will place a hold on deposited funds until they are cleared. A consumer who does not have enough funds in his intermediate account to pay for his on-line purchase will have to wait for the funds to clear before he can complete his purchase.

Consumer pre-authorized direct debit methods are known and typically used for on-line payment of bills, such as utility bills, and for recurring payments. However, a merchant needs prior standing authority from the consumer. Without this explicit authority no third parties, such as merchants, are able to access funds from the customer. Such an arrangement is tedious and inconvenient to set up. In any event, customers are extremely reluctant to give authority to a third party to access their funds and there are concerns about fraud and difficulty in canceling such authority.

Customer initiated electronic checks (e-checks) are known and can be used for on-line purchases. Typically the customer provides his routing and account number and the merchant or processor debits funds from the consumer's account through the check clearing network. The problems with this method include the lack of any real time verification of account ownership, authorization, or sufficient funds, and a lack of a real time settlement system. In addition, there is no built in identity verification or notification of transaction success. Similar to the above, this method also provides third parties with direct access to the user's financial account information.

Therefore a need exists to overcome the problems with the prior art as discussed above.

SUMMARY OF THE INVENTION

The invention provides a device, method, and system for facilitating financial transactions that overcomes the hereinafore-mentioned disadvantages of the heretofore-known devices and methods of this general type. The invention provides a user with the ability to direct-debit the account of their financial institution to a stored-value financial instrument that may then be used in both on-line and off-line financial transactions with a merchant.

With the foregoing and other objects in view, there is provided, in accordance with the invention, a device for conducting a secure transaction over a network, with the device having at least one network connection communicatively coupled to at least one network device and a processor communicatively coupled to the at least one network connection. The processor is operable to (1) receive, over the at least one network connection, from a user having been issued a stored-value financial instrument, a dollar amount to be associated to the stored-value financial instrument, (2) receive from the user, over the at least one network connection, a selection of a non-integrated financial institution from a list including at least one non-integrated financial institution, (3) receive, over the at least one network connection, a financial-institution user-identifier from the user, (4) communicate, over the at least one network connection, the financial-institution user-identifier to the selected non-integrated financial institution, and (5) participate, over the at least one network connection, in a user-free electronic dialogue with the selected non-integrated financial institution, the dialogue including a request to transfer funds in the dollar amount specified by the user from the selected non-integrated financial institution.

In accordance with a further feature of the present invention, the processor is further operable to associate funds received from the selected non-integrated financial institution to the stored-value financial instrument.

In accordance with another feature of the present invention, the processor is further operable to participate, over the at least one network connection, in a user-free electronic dialogue with the selected non-integrated financial institution upon receiving a funds request from a merchant.

In accordance with yet another feature, an embodiment of the present invention includes an agent operable to conduct the user-free electronic dialogue by automatically performing substantially all steps for electronic communication with the selected non-integrated financial institution to access an account associated with the user.

In accordance with a feature of the present invention, the processor is further operable to associate funds received from the selected non-integrated financial institution to the stored-value financial instrument.

In accordance with a further feature of the present invention, the stored-value financial instrument is not issued by the selected non-integrated financial institution.

In accordance with yet another feature of the present invention, the processor is further operable to identify receipt of the funds from the selected non-integrated financial institution into the stored-value financial instrument.

In accordance with another feature of the present invention, the processor is further operable to receive, over the at least one network connection, a financial-institution pass-code from the user and communicate, over the at least one network connection, the financial-institution pass-code to the selected non-integrated financial institution.

In accordance with the present invention, a device also includes an input operable to receive a selection of a non-integrated financial-institution from a user, receive a financial-institution user-identifier from the user, and receive a dollar amount from the user having been issued a stored-value financial instrument, the dollar amount being associated to the stored-value financial instrument. The device also has a processor communicatively coupled to the input, with the processor operable to initiate and maintain a user-free communication session with the selected non-integrated financial institution. The device also includes an output operable to communicate the financial-institution user-identifier to the selected non-integrated financial institution and communicate to the selected non-integrated financial institution a request to transfer funds in the dollar amount supplied by the user.

In accordance with a further feature of the present invention, the processor is also operable to facilitate an agent that automatically performs substantially all steps of the user-free communication session with the selected non-integrated financial institution to gain access to an account associated with the user.

In accordance with an additional feature of the present invention, the input is further operable to receive a financial-institution pass-code from the user and the output is further operable to communicate the financial-institution pass-code to the selected non-integrated financial institution.

In accordance with the present invention, a method for conducting a secure transaction over a network, the method including (1) receiving from a user, being issued a stored-value financial instrument, a dollar amount to be associated to the stored-value financial instrument, (2) communicating the dollar amount to a debit agent residing on a network processing and communication device, (3) receiving at the debit agent a selection of a non-integrated financial institution selected from a list that includes at least one non-integrated financial institution, (4) receiving at the debit agent a financial-institution user-identifier from the user, (5) communicating the financial-institution user-identifier from the debit agent to the selected non-integrated financial institution, (6) participating in a user-free electronic dialogue between the debit agent and the selected non-integrated financial institution, the dialogue including a request to transfer funds from the selected non-integrated financial institution, and (7) transferring, with the debit agent, the funds from the selected non-integrated financial institution to the stored-value financial instrument.

In accordance with another feature, an embodiment of the present invention also includes transferring the funds associated with the stored-value financial instrument to an account identified by a merchant.

Although the invention is illustrated and described herein as embodied in a device and method for facilitating financial transactions, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention.

While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward.

Described now is an exemplary device, system, and method for transferring funds from a financial institution to a stored-value financial instrument (SVFI) to be used in economic transactions. In one example of the present invention allows a user to receive funds into an intermediary account by utilizing an inventive server device that intelligently and securely facilitates a funds transfer from the user's financial institution to the intermediary account. The invention, according to particular embodiments, is advantageous in the respect that the consumer only provides sensitive information to a single entity that is consistent throughout all transactions, regardless of the various merchant selected and allows the SVFI to be used virtually anywhere for virtually any merchant.

Furthermore, the inventive system does not require a consumer to provide credit card or other sensitive financial information associated with the user's financial institution to a merchant. The consumer only provides sensitive information to a single entity that is consistent throughout all transactions, regardless of the various merchant selected. This open-loop transaction method gives great versatility to the user. The system also provides the user the ability to use the funds, within the intermediary account, similar to those funds actually held within the user's financial institution.

Network

Figure 1:
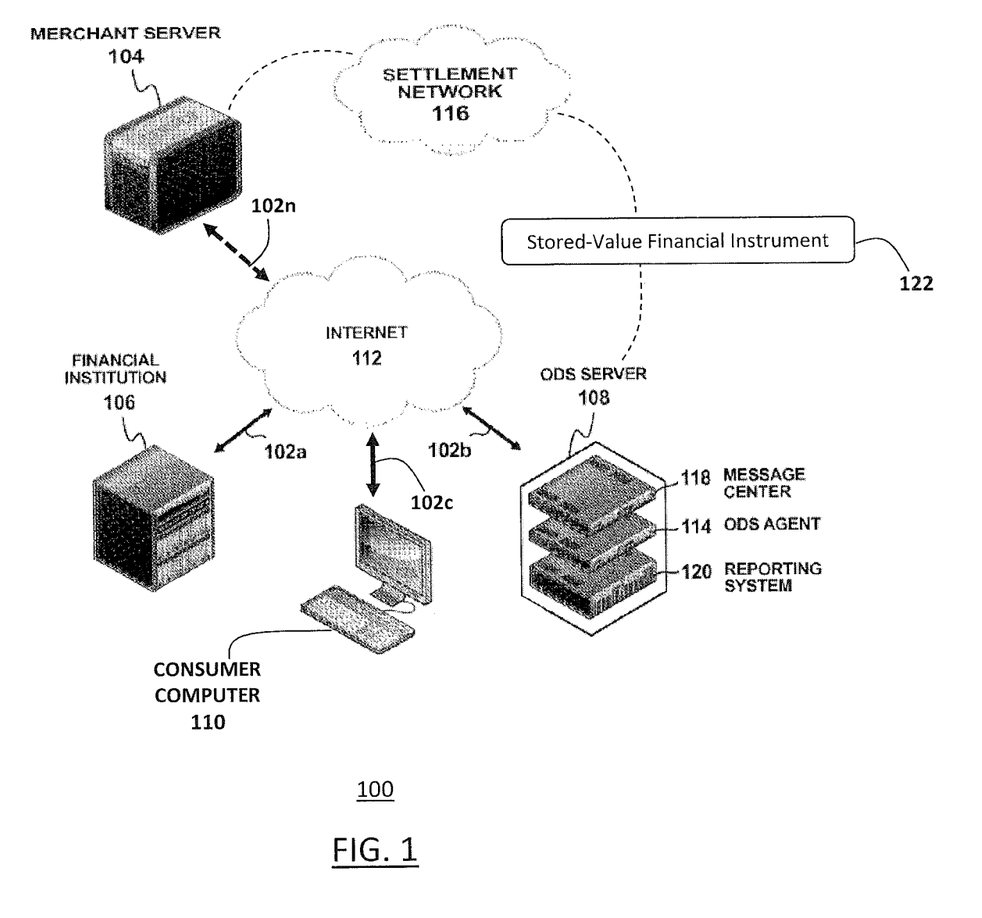
FIG. 1 illustrates an exemplary distributed data processing system in accordance with an embodiment of the present invention.

With reference now to the figures, FIG. 1 depicts a representation of a network 100 of data processing systems in which the present invention may be implemented. The network 100 includes connections 102a-n, which are the medium used to provide communications links between various devices and computers connected together within the network 100. The connections 102a-n may be wired or wireless connections. A few exemplary wired connections are cable, phone line, and fiber optic. Exemplary wireless connections include radio frequency (RF) and infrared radiation (IR) transmission. Many other wired and wireless connections are known in the art and can be used with the present invention.

In the depicted example, a merchant server 104 may be directly connected to the network 100 in order to process a financial transaction or, in some embodiments, may not be connected to the network 100. The discretionary connectability of the merchant server 104 is indicated by a hash-line arrow 102n. A financial-institution server 106 and an On-line Debit System (ODS) server 108 running an ODS agent 114 are connected to the network 100. Again, it should be noted that the merchant server 104 is only exemplary and is not required in order for the present invention to be carried out. In addition, a consumer 110 is also connected to or has at least temporary access to the network 100. "Consumer" may be interchangeably used herein with the term "user," depending on the step the user is in the transaction process. Furthermore, the consumer 110 may be, for example, a personal computer or network computer or any other device that has electronic communication capabilities and is able to communicate with or over the network 100.

The network 100 may include additional servers, consumers, and other devices and entities not shown. In the depicted example, the consumer 110 communicates with the financial institution service 106 through the ODS server 108 and, as will be explained in detail below, the financial institution transmits funds to a stored-value financial instrument (SVFI) 122. The consumer 110 is also able to communicate over the network 100 with additional servers, consumers, and other devices and entities. Any of the depicted network entities, in addition to communication with each other over the network 100, are, in some embodiments, also able to communication in a peer-to-peer communication using wired or wireless links.

The SVFI 122 may then communicate over traditional processing networks, which may include the internet, to remove funds from the SVFI 122 to a merchant. The transfer to the merchant may occur through the merchant server 104. Systems and processes for transferring funds from the SFVI to the merchant are generally known by those skilled in the art. This process, however, may include the merchant's server 104, or processor, communicating with the settlement network 116, e.g., VISA/MASTERCARD. Next, the settlement network 116, e.g., VISA/MASTERCARD, routes the transaction to the ODS server 108, who now also becomes an issuing bank. This advantageous feature removes the consumer's financial institution (formerly the issuing bank) from the transaction process, thereby minimizing the possibility of theft on the consumer. In other embodiments, the settlement network 116 may communicate with one or more additional servers working alone, or in combination with, the ODS server 108.

The ODS server 108, may then record or report the transaction and issue an approval or refusal to the settlement network 116 based upon the available funds within the consumer's account. In another embodiment, the ODS agent 114 may communicate with the financial institution server 106 to again withdraw funds to replenish the consumer's account. In yet another embodiment, this automatic withdraw from the user's selected financial institution, including selecting parameters such as the frequency, amount, and preauthorization/approval, may be determined when the user first logs into the ODS server 108. In other embodiments, this may occur after the first login by the user. When the approval is sent to the merchant 104, the financial transaction is complete and the settlement network 116 continues to effectuate the removal of the funds from the consumer's SVFI 122 to the merchant 104. This typically occurs by transferring funds first to the settlement network, e.g., VISA/MASTERCARD, and then transferring the funds to the merchant's bank.

The merchant server 104 and financial institution server 106 represent a merchant and a financial institution, respectively, that operates or communicates through the merchant server 104 and financial institution server 106. Therefore, throughout the remainder of the specification, the merchant server 104 and financial institution server 106 will be referred to generally as the "merchant" 104 and "financial institution" 106.

In the depicted example, network 100 can include the Internet 112, which represents a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network 100 also may be implemented as a number of different types of networks, such as for example, an Intranet, a local area network (LAN), or a wide area network (WAN). FIG. 1 is intended as an example, and not as an architectural limitation for the present invention.

Server/Computer

Figure 2:
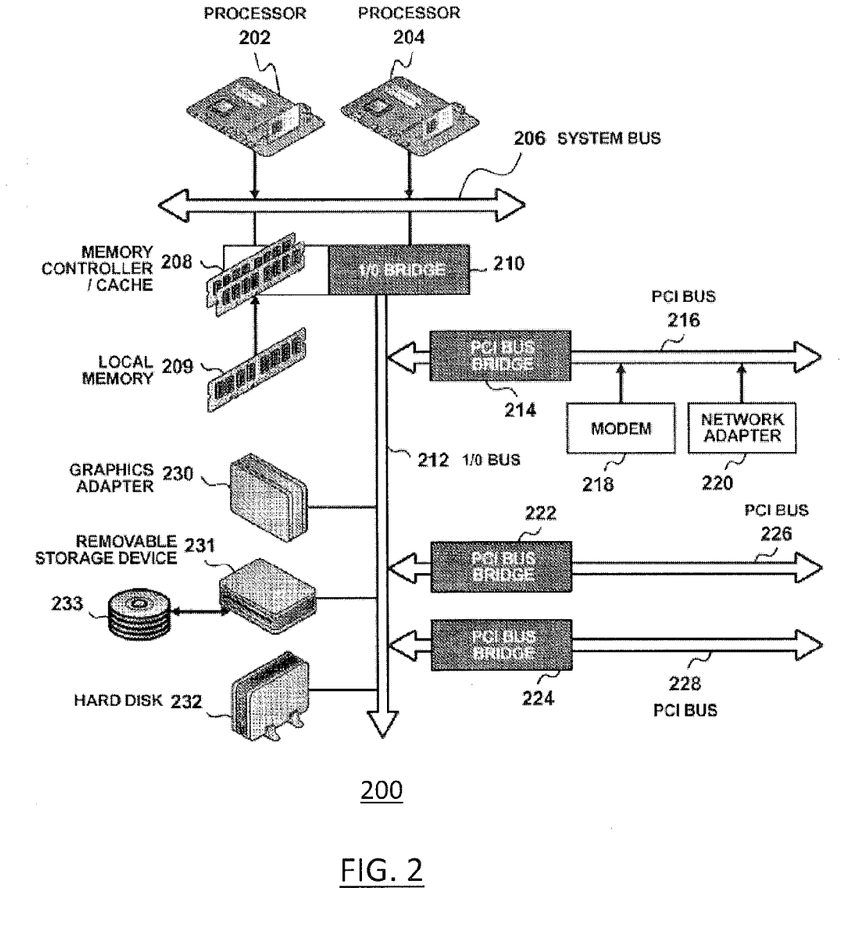
FIG. 2 is a block diagram of a data processing system that may be implemented as a network device, such as a server shown in FIG. 1, in accordance with an embodiment of the present invention.

Referring to FIG. 2, a block diagram of a data processing system 200 that may be implemented as a server, such as servers 104, 106, or 108 or implemented as a personal computer, such as consumer computer 110 in FIG. 1, is depicted in accordance with one embodiment of the present invention. Data processing system 200 may be a symmetric multiprocessor (SMP) system including a plurality of processors 202 and 204 connected to system bus 206. Alternatively, a single processor system may be employed. Also, connected to system bus 206 is memory controller/cache 208, which provides an interface to local memory 209. An I/O bus bridge 210 is connected to system bus 206 and provides an interface to I/O bus 212. Memory controller/cache 208 and I/O bus bridge 210 may be integrated as depicted. The processor 202 or 204 in conjunction with memory controller 208 controls what data is stored in memory 209. The processor 202 and/or 204 and memory controller 208 can serve as a data counter for counting the rate of data flow to the memory 209 or from the memory 209 and can also count the total volume of data accessed to or from the memory 209. The processor 202 or 204 can also work in conjunction with any other memory device or storage location.

Peripheral component interconnect (PCI) bus bridge 214 connected to I/O bus 212 provides an interface to PCI local bus 216. A number of modems 218 may be connected to PCI bus 216. Typical PCI bus implementations will support four PCI expansion slots or add-in connectors. Communications links to network computers in FIG. 1 may be provided through the modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The ODS agent 114 is explained in detail below and can be embodied in a computer program. Computer programs (also called computer control logic) are stored in memory such as main memory 209, removable storage drive 231, removable media 233, hard disk 232, and signals. Computer programs may also be received via communications interface 216. Such computer programs, when executed, enable the computer system to perform the features of the present invention as discussed herein. In particular, the computer programs, when executed, enable the processor 202 and/or 204 to perform the features of the ODS agent 114.

In this document, the terms "computer program medium," "computer usable medium," and "computer readable medium" are used to generally refer to media such as main memory 209, removable storage drive 231, removable media 233, hard disk 232, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information.

On-Line Transactions

The above-described hardware is useful for implementing the present invention, which accomplishes secure on-line, or off-line, transactions between the consumer 110 and the merchant 104 through utilization of an ODS server 108 and an ODS agent 114. Specifically, the inventive ODS server 108 securely transfers funds from the consumer's financial institution 106 to the SVFI 122, wherein the SVFI 122 can be utilized to conduct a financial transaction with merchant 104. This financial transaction can be conducted on-line, or off-line. An "on-line" transaction is defined herein as any transaction that occurs at least partially over any electronic communication network. An "off-line" transaction is defined herein as any transaction that does not occur at least partially over any electronic communication network.

Figure 3A:
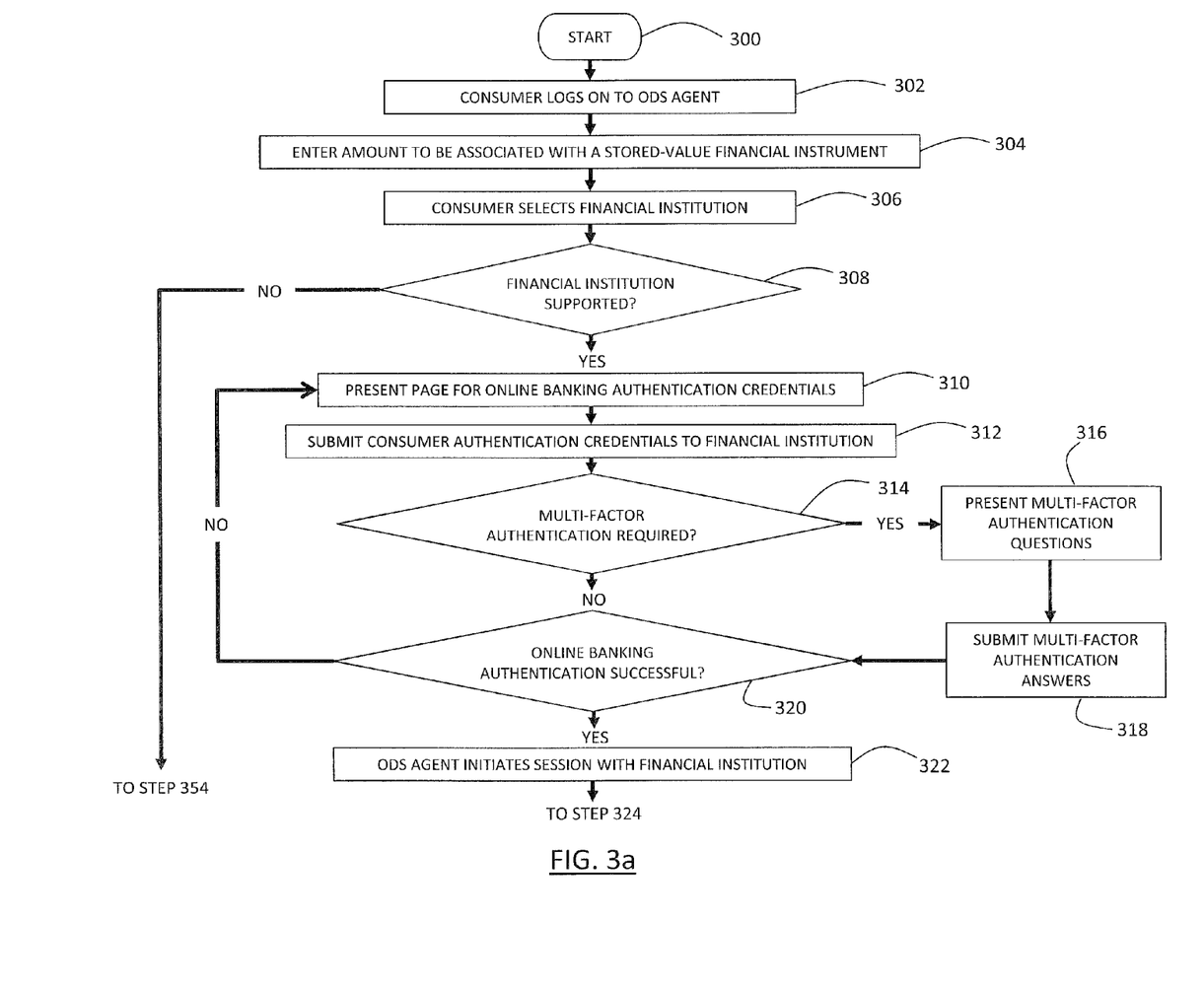
FIGS. 3a & 3b are a single process flow diagram showing a method of facilitating and completing financial transactions in accordance with an exemplary embodiment of the present invention.
Figure 3B:
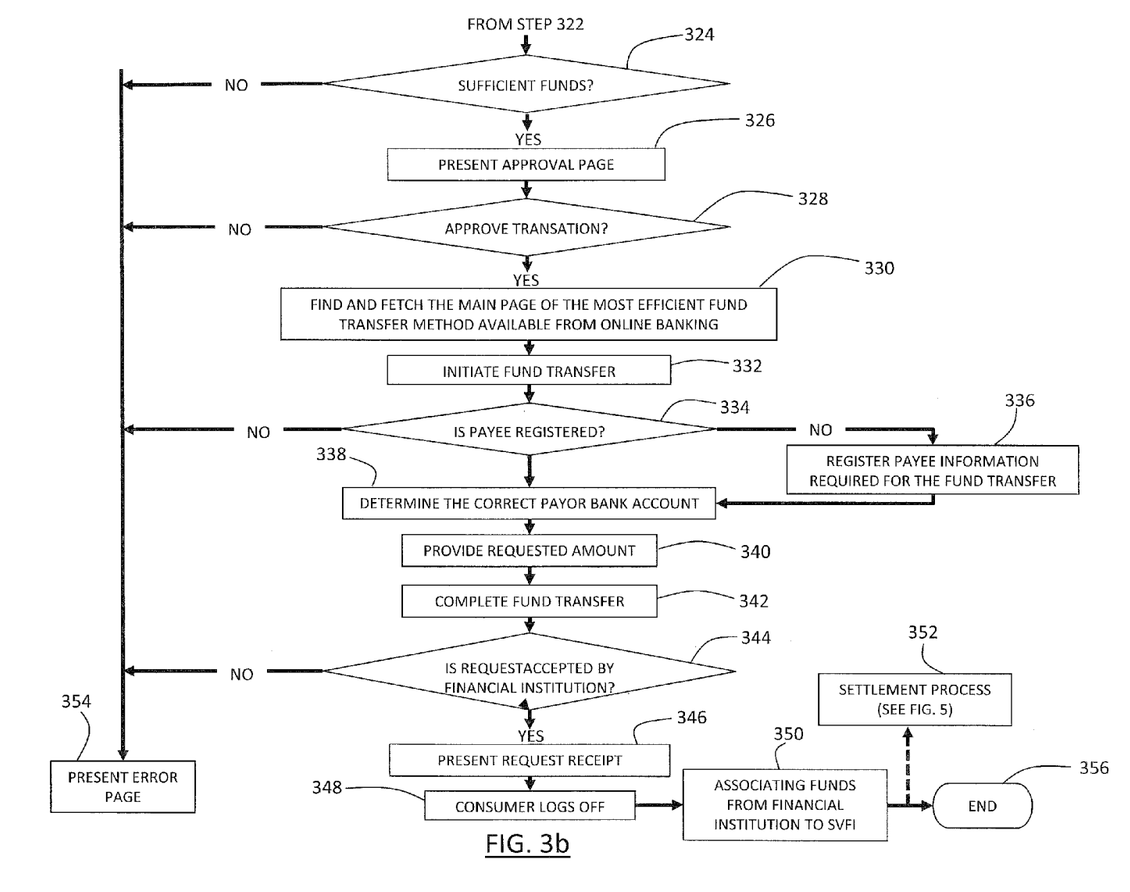

FIGS. 3a and 3b illustrate a single process flow of one embodiment of the present invention. The process flow provides exemplary steps for carrying out an exemplary embodiment of the present invention. The invention however is not limited to the number or the order of steps shown in FIGS. 3a and 3b.

The flow starts at step 300 and moves directly to step 302 where a consumer uses a consumer computer 110 to log-in to the ODS agent 114 through a network, such as the internet 112. It is noted that a consumer 110 is not shown in FIG. 1; however, for the purposes of the instant discussion, a consumer and a consumer computer are indistinguishable. Web pages are well known in the art and are a resource of information that is suitable for access over the internet 112 and can be accessed through a web browser running on a computing system, such as consumer computer 110. Web pages may consist of files of static text stored within a server's file system (static web pages), or the web server may construct the (X)HTML for each web page when it is requested by a browser (dynamic web pages). Client-side scripting can make web pages more responsive to user input once in the client browser. Web pages are requested and served from web servers using Hypertext Transfer Protocol (HTTP). This information is usually in HTML or XHTML format, and may provide navigation to other web pages via hypertext links within the page.

In other embodiments, the consumer may log into the network 100 utilizing a telephone network, wherein the user calls another individual or system connected to the network 100. The telephone network may include telephone lines, fiber-optic cables, microwaves, microwave transmission, cellular networks, and communication satellites. In such an embodiment, said log-in information may be transmitted over the telephone network where the individual, who may be on a LAN connection to the network, would input the information. In addition to this being carried out for the log-in process, it may also be implemented for any other step with the process flow diagram requiring a network connection.

The ODS server 108 is a physical hardware device and the ODS agent 114 can be hardware and/or a computer program that is responsible for accepting HTTP requests from a consumer 110 and serving them HTTP responses along with optional data contents, which usually are web pages such as HTML documents and linked objects (images, etc.). In one exemplary embodiment, should the ODS agent 114 still be connected to the internet after the process of funding the SVFI 122, the ODS agent 114 may also be configured to accept HTTP requests from a merchant 104, or other processing servers, in addition to also serving those servers with HTTP responses along with optional data contents. In further embodiments, the ODS server 108 and ODS agent 114 may also receive, through the merchant's on-line application, payment details, such as order number, amount, and others information.

ODS Agent

The ODS agent 114 is a programming module that provides other network components with programming interfaces to on-line banking authentication and fund transfer services through a specific financial institution. The ODS agent 114 handles HTTP communications and HTML contents intelligently to automate intermediate interactive steps required to effect an on-line fund transfer. It encapsulates such complexity from other ODS components by providing well defined programming interfaces. By implementing and utilizing ODS agents 114, an ODS system can thus present a universal and clean interface for consumers to transact on-line debits efficiently and securely through heterogeneous on-line banking services. In other words, once a user provides his financial institution identification information, the ODS agent 114 conducts a user-free (i.e., user's further input is not needed) communication session with the financial institution 106. This provides the user with the ability to transfer funds to the SVFI 122 once, or a plurality of times, without the threat of the user's financial information being intercepted or without any sensitive information associated with the financial institution 106 being given to an unknown third party.

To manage the complexity for both implementation and maintenance, an agent 114 is constructed in such a way that it can automatically adapt to non-structural changes of on-line banking services while monitoring and reporting functional changes of the services so that modifications can be applied easily and accurately.

In an exemplary implementation, an ODS agent provides the following functionalities:

Programming interface for on-line banking authentication service

Programming interface for on-line fund transfer service

Mechanism for on-line banking session management

Authentication service is an integral part of on-line banking services. To comply with regulatory rules and assure the integrity of the entire system, on-line banking utilizes leading edge technologies for user authentication to address fraud and repudiation concerns. In practice, the implementation of such service varies from bank to bank. Most banks nowadays require multi-factor authentication when an unusual usage pattern is detected (for example when a user logs in from a new device for the first time). Multi-factor authentication may, on top of usual authentication credentials such as log-in and password, involve (random) Q and A (question and answer) tests from a set of questions that are preset by a consumer for on-line banking. Most banks also avoid unnecessary multi-factor authentication by maintaining a (device) token on the consumer's computer device after a successful multi-factor authentication.

The presently inventive ODS agent 114, according to an embodiment, implements online banking authentication. It may cache (device) tokens set by on-line banking to pass multi-factor authentication when applicable. The caching mechanism may be implemented by keeping track of the token for a specific on-line banking log-in and storing it in a database for subsequent usage. In one embodiment, this facilitates the ODS agent 114 in continually updating the SVFI 122 based upon certain parameters set up by the consumer 110. Some of these parameters may include replenishing the SVFI 122 when the amount of funds associated with the SVFI 122 fall below a certain predefined limit, always replenishing the SVFI 122 when the funds associated to the SVFI 122 are completely depleted, or other parameters set by the consumer 110. This replenishment process may occur before, or after, any requests are received by the ODS server 108 to remove funds from the SVFI 122.

Fund transfer services are part of on-line banking services for consumers to pay service providers (utilities etc.) or other account holders (accounts in another financial institution, friends, relatives etc.) conveniently and efficiently. Banks may provide one or more ways to facilitate the payments and each of them involves quite different steps or set up. Banks may add more methods with advancement in payment technology for specific bank or the banking industry as a whole.

The ODS agent 114 is able to implement the most efficient fund transfer service available from a specific bank. In particular it is able to verify the availability of sufficient funds for a particular payment to avoid inconvenience and cost arising from overdraft or insufficient funds (NSF). Also the agent 114 is able to automatically determine and select a proper bank account for the payment when multiple accounts are present for on-line banking. It encapsulates the details from other ODS components so that the payment method may be replaced by a more efficient one in the future while keeping the interface to consumers (user experience) intact.

Session management is an important part of on-line banking services. On-line banking services utilize session control to manage states of a multiple-step operation. They also apply session control to protect services or resources from unauthorized usage. The techniques may involve cookie management or URL rewriting.

According to an embodiment of the present invention, the ODS agent 114 implements session management required by on-line banking services to facilitate multi-step fund transfers. It also maintains the session after successful authentication and instructs on-line banking server to close the session once a transfer is completed.

Again, in step 302, the consumer logs onto the ODS agent 114. For logging in, the consumer may have at least two ways of identifying him or herself to the ODS agent 114. If the consumer is a returning user, he or she can log in with a previously-established user name or email address and password. If this is the consumer's first time accessing the ODS agent 114, the consumer is able to create a new account by filling in user information fields. In one embodiment of the present invention, the ODS agent 114 by default or by a consumer's instruction, does not store the consumer's log in information. This feature provides an added layer of security, so that the consumer does not have to worry about his/her private information being obtained by a third party.

Alternatively, the consumer's personal information can be provided to the ODS server 108 by another server connected to the network. In such an embodiment, as a security measure, the ODS agent 114 may ask for the same information and compare it to that personal information submitted by the other server. If a difference in the two sets of information is detected, the process may be terminated. In another embodiment, the ODS server 108 may submit additional authentication protocols that would need to be verified by the consumer 110 before the process continued.

Figure 4:
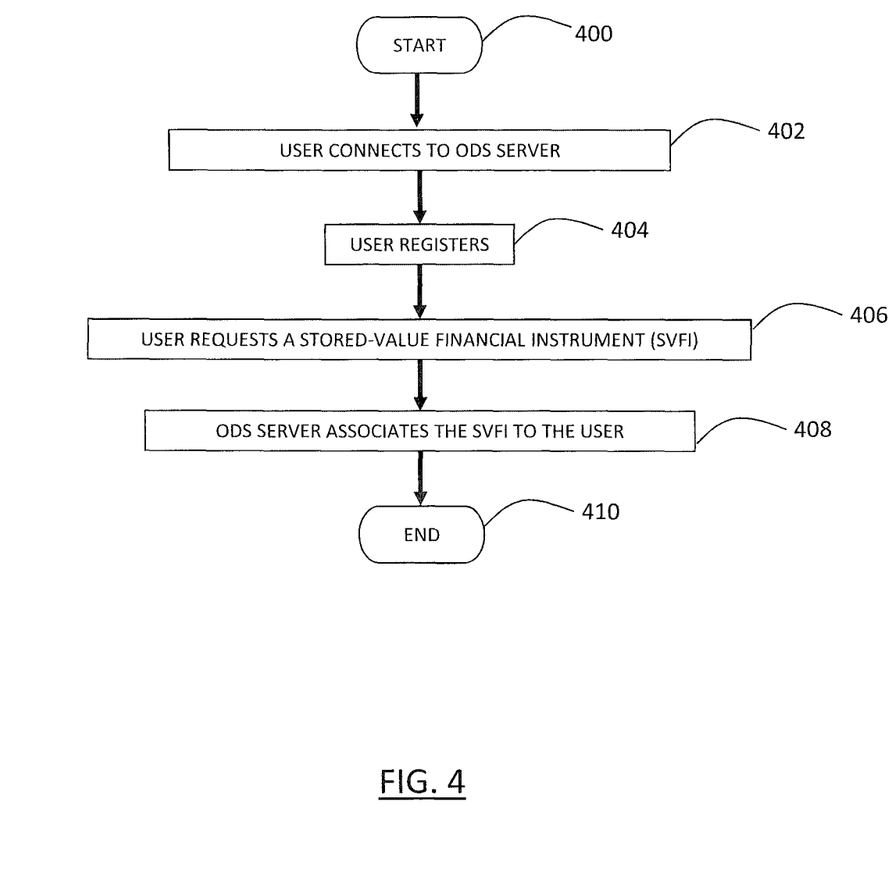
FIG. 4 is a process flow diagram showing a method of assigning and associating a stored-value financial instrument to a user in accordance with an embodiment of the present invention.

Once the consumer has identified himself, a web page may be shown that allows the consumer 110 to select or insert a dollar amount to be associated with the SVFI 122. This step 304 is represented in FIG. 3a. The process of issuing the SVFI 122 is diagramed in FIG. 4 and essentially includes starting at step 400 and then immediately advancing to the step 402, which is connecting to the ODS server 108, or ODS agent 114. This may be accomplished within the same step 302 (represented in FIG. 3a), i.e., logging into the ODS agent. In other embodiments, connecting to the ODS server 108 may be done in a step outside of the process of transferring funds to the SVFI 122. Step 404 includes the user registering the necessary information to effectively associate the user with the SVFI 122. The inventive device, system, and method are also advantageous because the funds associated with the SVFI 122 are directly debited from the user's financial institution 106, thereby not requiring any credit or background checks for the user. Next, in step 406, the user requests a SVFI to be assigned to the user Immediately following the request for the SVFI 122, the next step 408 includes associating the SVFI 122 to the user. This may be accomplished utilizing one or more programs within the ODS server 108, or any other server communicatively coupled to the ODS server 108. In one embodiment, the SVFI 122 may take the form of a tangible card that is then distributed to the user. As previously discussed, the card is the operable to be used in combination with typical card processing methods to deliver the funds associated with the SVFI 122 to a merchant 104. In other embodiments, the SVFI 122 may take the form of digital card. Regardless the form, the inventive ODS server 108, in combination with the ODS agent 114, allow the SVFI 122 to be utilized in an open-loop process whereby the SVFI 122 can be used virtually anywhere and with virtually any system. This is accomplished while allowing the ODS server 108, specifically the ODS agent 114, to withdraw funds from the user's financial institution 106 without the user's participation. The process of FIG. 4 terminates in step 410.

The financial institutions can be banks or other entities where the consumer has established an account. The financial institutions may be a place that the consumer has stored money or can be an entity that extends credit to the consumer. Referring back to FIG. 3a, in step 306, the consumer selects one of the financial institutions (if more than one is offered) from a list of available financial institutions. The ODS agent 114, in step 308, determines whether the selected financial institution is supported by the ODS agent 114 and any associated system in which the ODS agent 114 is employed. If the financial institution is not supported, the flow moves to step 354 where an error page is presented to the consumer indicating that the transaction is not going to be processed through the ODS agent 114. In alternative embodiments, the ODS agent 114 may be operable to send an indication of the failed transaction to one or more servers communicatively coupled to the network, e.g., the merchant 104. The process would then end at step 356. Alternatively, if the financial institution is supported, the flow moves from step 308 to step 310.

In step 310, the ODS agent 114 determines the information required by the selected financial institution for gaining access to the consumer's account at that institution and then presents a financial-institution log-in information to the consumer 110. This log-in information requests the necessary authentication credentials from the consumer 110. In one embodiment, the required log-in information requires the consumer's identifying information and, in a second field, a password. After the information is entered into the ODS agent 114 it is submitted to the specified financial institution 106 in step 312.

In step 314, the ODS agent 114 determines whether or not the financial institution 106 requires "multi-factor" authentication. Multi-factor authentication is a relatively-new procedure for ensuring the person accessing the account has permission to do so. One example of multi-factor authentication is where a user selects a particular graphic at some point when setting up the account. During the log-in, the consumer 110 is given a choice of graphics and, only upon making the correct selection of graphics, is he granted access to the account. In other systems, the consumer 110 is given one or more challenge questions to answer.

If the answer to query 314 is yes, the process moves to step 316 where the ODS agent 114 presents the multi-factor authentication to the consumer. The consumer presents the answer and, in step 318, the ODS agent 114 submits the consumer's answers to the financial institution 106. In one embodiment, this information is stored on the ODS server 108, or other server communicatively coupled to the ODS server 108, for future use. In other embodiments, this information may not be stored, thereby requiring the user to input the authentication factors another time.

In step 320 the ODS agent 114 interprets the response from the financial institution and determines whether the authentication credentials are valid and accepted by the financial institution. If the credentials are not accepted by the financial institution the user returns to step 310 to correct the authentication credentials. If the user is unable to enter correct authentication credentials the transaction will not proceed. If the authentication credentials are accepted by the financial institution the process proceeds to step 322.

In step 322, the ODS agent 114 acts on behalf of the consumer and maintains a session with the financial institution 106 in order to interact and respond to actions and messages from the financial institution 106. In other words, the ODS agent 114 implements and maintains programmatically all steps required to interact with a bank's on-line financial services to facilitate a funds transfer. Specifically, the ODS agent 114 performs all the actions and functions that would be otherwise undertaken by the consumer 110. The process involves significant two-way communication between the ODS agent 114 and the financial institution 106. Advantageously, this process is invisible to, and involves relatively little collaboration with, the consumer 110. The consumer 110 only provides their authentication credentials to the ODS agent 114 and all other actions are handled by the agent 114.

This is significantly different from a proxy-server-type of interaction between a consumer and a bank site, whereby the server is merely a conduit that passes information to and from the consumer but does not act on behalf of the consumer or interpret the messages and screen code on the bank site.

Advantageously, the on-line financial institution 106 does not recognize the difference between interacting with a consumer directly and interacting with the ODS agent 114. This is not simply a matter of pre-populating fields or amalgamating steps for the consumer—it is an active agent that is undertaking steps completely independent of any interaction from the consumer. For example, the ODS agent 114, in step 322, performs functions, such as entering and submitting information, reacting to messages or pages loading on the bank site, and opening and closing the authenticated session with the bank server. The agent 114 acts independently based on a pre-determined set of steps and interactions necessary to complete a bill pay or other payment on behalf of the consumer. The complexity of accomplishing this interaction is significant given the fact that each bank site may have different authentication procedures, information requirements, session maintenance systems, protocols, and data entry sequences. The ODS agent 114 also interprets and decodes unique pages from each bank site to determine the result and appropriate response.

One advantage of the ODS agent 114 is that it does not require a system level integration with the financial institution server 106. "System level integration" can be described as entailing communication between two independent systems based on an agreed upon set of communication parameters and protocols. In a "system level integration" both systems conform to a common communication protocol which defines how the systems exchange data and authenticate each other. It requires participation and cooperation from both sides and also the complete and formal consent of both parties. The parameters and protocol are generally defined in a technical document called an application programming interface or "API." In other embodiments, the parameters and protocols maybe defined within an application binary interface "ABI." The ODS agent 114 of the present invention is advantageous in that it does not require this integration with the financial institution. In fact, unlike currently-available systems, the present invention requires no pre-transaction communication with a financial institution. The ODS agent 114 works as an extension of the consumer and relieves the consumer from all or virtually all post-identification transaction steps. As a result, the ODS agent 114 is able to communicate with non-integrated (no previous relationship or correspondence is necessary) financial institutions.

In step 324, the ODS agent 114 determines whether sufficient funds are in the consumer's account. It does this by comparing the account balance at the financial institution to the requested funding amount requested by the user in step 304. If there are not sufficient funds in the account to cover the amount requested in step 304, the flow moves to step 354 where an error page is presented to the consumer 110 indicating that the request is not going to be processed through the ODS agent 114. In other embodiments, the ODS server 108 is also operable to send an indication of the failed request to the merchant 104 or to another server connected to the network 100, or otherwise communicatively coupled to the ODS server 108, e.g., a server located within the settlement network 116. Alternatively, if sufficient funds in the user's account to cover the amount requested in step 304, the ODS agent 114 will present an approval page to the consumer 110, in step 326. Again, the ODS server 108 is also operable to send an indication of the approved request to the merchant 104 or to another server connected to the network 100, or otherwise communicatively coupled to the ODS server 108.

The consumer 110 can then, in step 328, approve the transaction. In one embodiment, the consumer's approval is indicated by the selection of one or more buttons on a webpage associated with the ODS agent 114. In other embodiments, the ODS agent 114 may have a pre-approval from the user 110, thereby allowing continuous approvals, whether the user 110 is on-line or not. As the user 110 is not required to approve the transaction, the user may use the SVFI 122 in a commercial transaction without having sufficient funds associated with it and without being on-line. The user 110 may simply use the SVFI 122 and upon receiving a request for funds (assuming there is insufficient funds associated with the SVFI 122 to cover the transaction) from a merchant, the ODS agent 114 would then request a transfer of funds from the consumer's account with the financial institution 106 to fund the SVFI 122.

If the consumer does not approve the transaction, the flow moves to step 354 where an error page is presented, indicating that the transaction is not going to be processed through the ODS agent 114. Again, the ODS server 108 is also operable to send an indication of the failed request to the merchant 104 or to another server connected to the network 100, or otherwise communicatively coupled to the ODS server 108. The process would then end at step 356.

If, in step 328, the consumer approves the transaction, the flow moves to step 330 where the ODS agent 114 will interact with the financial institution 106 and determine the most efficient funds transfer method available from the financial institution 106. In step 332, the ODS agent 114 initiates the funds transfer through the funds transfer method determined in step 330. Before continuing, however, in step 334 the ODS agent 114 determines whether or not the payee has previously been registered with the funds transfer channel. If not, the flow moves to step 336, where the payee is registered.

If the answer to step 334 is yes, or after the payee is registered in step 336, the flow moves to step 338 where the correct payor bank account is determined. This step is used where the payor has multiple accounts to select from, such as checking, savings, money market, and others. Once the account is selected, the flow moves to step 340 where the requested amount is provided to the financial institution 106. In step 342, the fund transfer is completed.

In step 344, the ODS agent 114 will interpret the financial institution's responses to determine the successful processing of the request. If the request is not accepted by the financial institution 106, the flow moves to step 354 where an error page is presented to the user 110 indicating that the transaction is not going to be processed. The ODS server 108 is also operable to send an indication of the failed request to the merchant 104 or to another server connected to the network 100, or otherwise communicatively coupled to the ODS server 108. If the request is accepted by the financial institution 106, a summary recording said transaction may be stored in the ODS server 108 or delivered to the user 110. The summary details the transaction and provides the consumer with a record of the transaction. This step is, of course, optional. The summary can also be emailed to the user using an email address that the user provided during the log-in process. In step 346 the customer is presented with a request receipt page. Then, in step 348, the consumer may log-off of the ODS agent 114.

The next step 350 includes associating the funds approved by the financial institution 106 to the SVFI 122. The user 110 was given an SVFI 122 within step 304. As such, each user may have one or more SVFI 122, with each SVFI 122 having an identifier. Each identifier has the ability to associate any funds to it. In one embodiment, a user 110 may have one account to associate any funds thereto. In other embodiments, a user 110 may have multiple accounts capable of associating any funds thereto. In one embodiment, this data may be stored on the ODS server 108. In other embodiments, the data may be stored off the ODS server 108, but the ODS server 108 would be communicatively coupled and accessible to the data storage. This presents the user with an account separate from his or her financial institution 106 with the ability to use the funds within that financial institution.

In one embodiment of the present invention, the payment from the SVFI 122 to a merchant 104 is through a settlement network 116, shown in FIG. 1. The settlement process is shown in step 352. A settlement network is a system that processes and pays electronic debits and credits between two or more entities. Advantageously, the present invention is "Settlement Network Independent," as it relates to the transfer or funding to the merchant. Said another way, although the inventive server 108 may be operable to also communicate with the merchant 104, it is not required to do so. Therefore, the transfer of funds from the financial institution 106 to the SVFI 122, and the transfer of the funds from the SVFI 122 to the merchant 104 (should this embodiment be implemented), is not reliant on any specific settlement network. Furthermore, the settlement of funds between (1) the financial institution 106 to the SVFI 122 and (2) the transfer of the funds from the SVFI 122 to the merchant 104 (should this embodiment be implemented) may be completely independent of one another.

Figure 5:
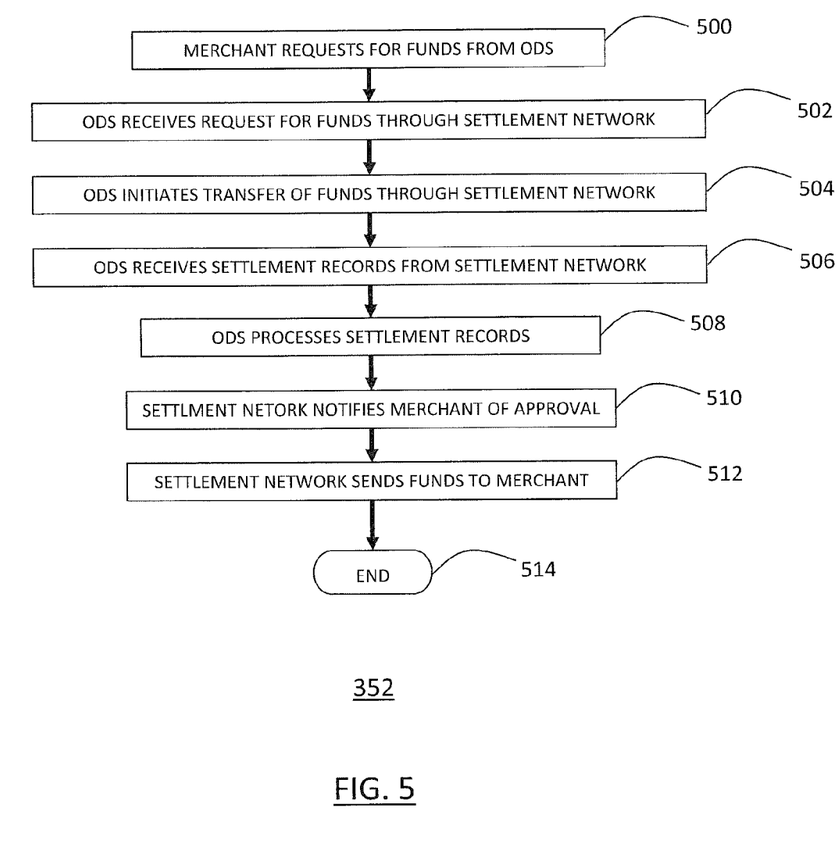
FIG. 5 is a process flow diagram showing a process for completing a settlement process in accordance with an exemplary embodiment of the present invention.

FIG. 5 shows exemplary steps performed in step 352 of FIG. 3B, should the ODS server 108, or any server associated with storing or controlling the funds of the SVFI 122, be operable to transfer funds to the merchant 104. FIG. 5 starts at step 500, after the user uses the SVFI 122 in a transaction, the merchant requests funds from the ODS. In other embodiments, there may be other servers operable to receive funds requests through use of the SVFI 122. In step 502, the ODS receives the request for funds through the settlement network 116. Next, in step 504, the ODS initiates the transfer of funds associated with the SVFI 122 to the settlement network 116. In step 506 ODS receives a settlement records from the settlement network 116. In one embodiment, the settlement file details all transactions (debits and refunds). The settlement file can be parsed and used to reconcile the transactions recorded on the ODS server 108 with those in the funds settlement network 116. Settled transactions may be returned by the ODS due to exceptional circumstances, such as charge backs or others. The returns can be deducted from future payments to the merchant 104. In step 508, the ODS processes the settlement records.

In one embodiment of the present invention, in step 510 the ODS may send a settlement notification to a merchant which may include fund transfers that have been voided, reversed, returned or settled. In step 512 the funds are pushed, i.e., caused to transfer, to the merchant's account, for example, through use of the settlement network 116. The funds may include net settled fund transfers less fees, reserves, returns, reversals and other deductions. The intermediary bank account is independent and can be any account at any bank. In this step, the ODS agent pushes the funds in the ODS's intermediate account to the merchant 104 or any account or entity that the merchant designates. The process ends at step 514.

As stated above, in step 332 the ODS agent 114 initiates the most efficient funds transfer on behalf of the consumer. It should be noted that the term "funds transfer," as used herein, is not an actual movement of currency, but can be an electronic credit or debit instruction transmitted over any communication channel. Any other method of transferring currency is also within the scope of the invention.

Many on-line systems that refer to themselves as "real time debit" systems are actually simply debiting funds that have already been deposited and cleared into a "virtual wallet" held by that service. These on-line systems, however, do not have the ability transfer funds once and continually from the user's financial institution 106 with little, and in some instances no, interaction with the user. The present invention provides a real-time, or quasi-real-time, debit system where, upon approval by the user 110, the ODS agent 114, in step 332, initiates the most efficient funds transfer method on behalf of the user directly from the user's bank account. In other words, the transfer of funds is from the financial institution and in the amount requested by the user in step 304. In some embodiments, the user is not even required to fund an account prior to the transaction with the merchant 104. This is primarily because the SVFI 122 may be used anywhere where a settlement network is present. Today, that is virtually everywhere.

The ODS server 108 may also include a message center 118, which is responsible for transmitting messages to merchants upon important events. The ODS server 108 is also operable to send messages to other servers connected to the network 100, or otherwise communicatively coupled to the ODS server 108. In particular, the message center 118 can transmit fund request results submitted to the financial institution 106 and settlement records resulting from the settlement network 116.

The ODS server 108 further includes a reporting center 120 that provides real-time or quasi-real-time reports through the internet 112 to merchants 104 on the payment, settlement, and distribution of transactions. The ODS server 108 is also operable to provide reports to other servers connected to the network 100, or otherwise communicatively coupled to the ODS server 108. The reporting system 120 may also supply a service that allows the merchant 104 to access key reports programmatically, for example, through an API, without human intervention.

CONCLUSION

The present invention, as has just been described, is advantageous in that it is an "intelligent agent" rather than a simple proxy or conduit. This means that the ODS agent 114 does not require user intervention for each step in the interaction with the financial institution 106. The intelligent agent 114 automatically executes most of the steps required to complete the funds transfer process. As an agent, the present invention does not require the bank site (financial institution 106) to integrate with the ODS agent 114. In other words, there is no need for a pre-transaction relationship to be established between the financial institution 106 and the ODS agent 114. The system is also bank independent; there is no "system level" or dependent integration with any bank or any specific financial system. In other words, the present invention can work with any on-line banking site. Because the system is not dependent on any "system level" integration or communication scheme or protocol, i.e. no direct system level integration, the ODS agent 114 can take advantage of any current or future on-line banking functionality.

The ODS agent 114 provides funds from a user's financial institution 106 to a SVFI, which now has an associated amount of funds that can be used by the user. As opposed to a closed-loop transaction, wherein the process begins with a request by the merchant and ends with funds being directed to the merchant, the present invention utilizes an open loop transaction. This means that the funds request comes from the user and ends with the funds being delivered to the merchant. Now, advantageously, a user may transfer funds to an account, with little to no interaction, both effectively and efficiently, and then use the SVFI anywhere where a settlement network is utilized. Furthermore, the consumer beneficially does not need to provide credit card or other sensitive financial information that relates to the user's financial institution to the merchant; the consumer only provides sensitive information to a single entity that is consistent throughout all transactions, regardless of the various merchant selected. Again, as opposed to closed-loop transaction that generally required the merchant to be equipped to communicate with the ODS server 108, now, the transaction may be completed virtually anywhere.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed:

1. A device for conducting a secure transaction over a network, the device comprising:
  at least one network connection communicatively coupled to at least one network device; and
  an intelligent agent and a processor communicatively coupled to the at least one network connection, the intelligent agent and the processor are operable to:
    receive, over the at least one network connection, from a user having been issued a stored-value financial instrument, a dollar amount to be associated to the stored-value financial instrument;
    receive from the user, over the at least one network connection, a selection of a non-integrated financial institution from a list including at least one nonintegrated financial institution;
    receive, over the at least one network connection, a financial-institution user-identifier from the user;
    communicate, over the at least one network connection, the financial-institution user-identifier to the selected non-integrated financial institution;
    participate, over the at least one network connection, in a user-free electronic dialogue with the selected non-integrated financial institution, the user-free electronic dialogue including a request to transfer funds in the dollar amount from the selected non-integrated financial institution;
    associate funds received from the selected non-integrated financial institution to the stored-value financial instrument; and
    identify receipt of the funds from the selected non-integrated financial institution into the stored-value financial instrument.

2. The device according to claim 1, wherein the intelligent agent and the processor are further operable to:
  participate, over the at least one network connection, in a the user-free electronic dialogue with the selected non-integrated financial institution upon receiving a funds request from a merchant.

3. The device according to claim 1, further comprising:
  an agent operable to conduct the user-free electronic dialogue by automatically performing substantially all steps for electronic communication with the selected nonintegrated financial institution to access an account associated with the user.

4. The device according to claim 3, wherein the intelligent agent and the processor are further operable to:
  associate funds received from the selected non-integrated financial institution to the stored-value financial instrument.

5. The device according to claim 1, wherein:
  the stored-value financial instrument is not issued by the selected non-integrated financial institution.

6. The device according to claim 1, wherein the intelligent agent and the processor are further operable to:
  receive, over the at least one network connection, a financial-institution pass-code from the user; and
  communicate, over the at least one network connection, the financial-institution passcode to the selected non-integrated financial institution.

7. A device for conducting a secure transaction over a network, the device comprising:
  an intelligent agent with an input operable to:
    receive a selection of a non-integrated financial-institution from a user;
    receive a financial-institution user-identifier from the user; and receive a dollar amount from the user having been issued a stored-value financial instrument, the dollar amount being associated to the stored-value financial instrument;
and
a processor communicatively coupled to the intelligent agent with the input, the processor operable to:
initiate and maintain a user-free communication session with the selected nonintegrated financial institution; and
associate funds received from the selected non-integrated financial institution to the stored-value financial instrument;
and
an output operable to:
communicate the financial-institution user-identifier to the selected non-integrated financial institution; and
communicate to the selected non-integrated financial institution a request to transfer funds in the dollar amount.

8. The device according to claim 7, wherein the processor is further operable to:
facilitate an agent that automatically performs substantially all steps of the user-free communication session with the selected non-integrated financial institution to gain access to an account associated with the user.

9. The device according to claim 7, wherein the processor is further operable to:
participate in the user-free electronic dialogue with the selected non-integrated financial institution upon receiving a funds request from a merchant.

10. The device according to claim 7, further comprising:
an agent operable to conduct the user-free communication session by automatically performing substantially all steps for electronic communication with the selected nonintegrated financial institution to access an account associated with the user.

11. The device according to claim 10, wherein the processor is further operable to:
associate funds received from the selected non-integrated financial institution to the stored-value financial instrument.

12. The device according to claim 10, wherein the processor is further operable to:
participate in the user-free communication session with the selected non-integrated financial institution upon receiving a funds request from a merchant.

13. The device according to claim 7, wherein:
the input is further operable to receive a financial-institution pass-code from the user; and
the output is further operable to communicate the financial-institution pass-code to the selected non-integrated financial institution.

14. A method for conducting a secure transaction using an intelligent agent over a network, the method comprising:
receiving from a user, being issued a stored-value financial instrument, a dollar amount to be associated to the stored-value financial instrument;
communicating the dollar amount to a debit agent residing on a network processing and communication device;
receiving at the debit agent a selection of a non-integrated financial institution selected from a list that includes at least one non-integrated financial institution;
receiving at the debit agent a financial-institution user-identifier from the user; communicating the financial-institution user-identifier from the debit agent to the selected non-integrated financial institution;
participating in a user-free electronic dialogue between the debit agent and the selected non-integrated financial institution, the user-free electronic dialogue including a request to transfer funds from the selected non-integrated financial institution; and
transferring, with the debit agent, the funds from the selected non-integrated financial institution to the stored-value financial instrument.

15. The method according to claim 14, wherein:
the funds transferred from the selected non-integrated financial institution to the stored value financial instrument is the funds the dollar amount supplied by the user.

16. The method according to claim 14, wherein:
the financial-institution user-identifier includes a pass-code.

17. The method according to claim 14, further comprising:
transferring the funds associated with the stored-value financial instrument to an account identified by a merchant.

* * * * *